United States Patent
Lundqvist

(10) Patent No.: US 9,956,832 B2
(45) Date of Patent: May 1, 2018

(54) TIRE PRESSURE MONITORING SYSTEM

(76) Inventor: Torbjörn Lundqvist, Fallbrook, CA (US)

( * ) Notice: Subject to any disclaimer, the term of this patent is extended or adjusted under 35 U.S.C. 154(b) by 99 days.

(21) Appl. No.: 14/005,904

(22) PCT Filed: Mar. 18, 2012

(86) PCT No.: PCT/US2012/029575
§ 371 (c)(1),
(2), (4) Date: Oct. 24, 2013

(87) PCT Pub. No.: WO2012/129132
PCT Pub. Date: Sep. 27, 2012

(65) Prior Publication Data
US 2014/0043154 A1   Feb. 13, 2014

Related U.S. Application Data

(60) Provisional application No. 61/454,483, filed on Mar. 18, 2011.

(51) Int. Cl.
*B60C 23/00* (2006.01)
*B60C 23/04* (2006.01)
*B60C 29/06* (2006.01)

(52) U.S. Cl.
CPC ........ *B60C 23/0433* (2013.01); *B60C 23/007* (2013.01); *B60C 23/0406* (2013.01); *B60C 23/0498* (2013.01); *B60C 29/064* (2013.01)

(58) Field of Classification Search
CPC ..... B60C 23/02; B60C 5/008; B60C 23/0433; B60G 2400/52
USPC ...... 340/447, 445, 442; 152/415; 137/116.3, 137/224
See application file for complete search history.

(56) References Cited

U.S. PATENT DOCUMENTS

| | | | | |
|---|---|---|---|---|
| 3,742,896 A | * | 7/1973 | Perry | B60C 23/02 116/34 R |
| 4,742,857 A | * | 5/1988 | Gandhi | B60C 23/004 137/225 |
| 2003/0102966 A1 | * | 6/2003 | Konchin | B60C 23/0428 340/445 |
| 2004/0112129 A1 | * | 6/2004 | Lundqvist | B60C 23/0408 73/146 |
| 2005/0110622 A1 | * | 5/2005 | Tsai | B60C 23/043 340/442 |
| 2007/0194895 A1 | * | 8/2007 | Apostolopoulos | B60C 23/0428 340/447 |
| 2008/0001729 A1 | * | 1/2008 | Kyllmann | B60C 23/009 340/445 |
| 2011/0272055 A1 | * | 11/2011 | Lepera | B60C 29/064 141/1 |

* cited by examiner

*Primary Examiner* — Phung Nguyen
(74) *Attorney, Agent, or Firm* — Eric B Alspaugh

(57) ABSTRACT

The invention comprises a tire pressure monitoring system. One system comprises a tire pressure monitor that signals to a user with audio alarm and visual alarm. Another component is the use of a tire air pressure balancing device with a safety trigger to ensure that dual tire systems share air but that stop sharing air in the case of rapid air pressure drop as in cases of tire blow out.

9 Claims, 16 Drawing Sheets

TIRE PRESSURE MONITORING SYSTEM

PRIORITY APPLICATIONS

This application claims priority to PCT application number PCT/US12/29575 filed Mar. 18, 2012 and to U.S. provisional patent application No. 61/454,483 filed on Mar. 18, 2011, the contents of which are incorporated herein.

FIELD OF INVENTION

The present invention relates to tire pressure monitoring systems TPMS and devices for trucks and heavy vehicles.

BACKGROUND OF THE INVENTION

The present invention relates particularly to tire pressure measuring devices for trucks and heavy vehicles such as tractors for hauling semi-trailers. One of the biggest operating expenses for trucks is the cost of tires. With underinflated tires, the wear of tires is excessive, the fuel consumption increases, the handling characteristics of the vehicle are affected in a negative manner and the risk for catastrophic tire failure increases, and the road safety is jeopardized. With under inflation the tires get hot and the risk for thread separation increases especially in re-threaded tires.

While the U.S. government has ruled mandatory on all new cars and light trucks to have an incorporated Tire Pressure Monitoring Systems TPMS on the vehicles there is no current law for the heavy vehicles. Therefore only a small percentage of trucks have TPMS installed as original equipment. Although truck drivers are typically aware of the importance of having the right tire pressure, the amount of time and effort needed to properly inspect the tire pressure in all the tires often makes the driver neglect the inspection assuming that the pressure is correct. In addition to being time consuming on the typical dual wheel rear axles it is also inconvenient since it is often necessary to be down on your knees on the ground to locate valve stems to be able to check the pressure. A study, conducted by the United States Government, showed that 56% of all truck on the road in USA had one or more tire underinflated. U.S. Dept. of Commerce, National Technical Information Service, pub #PB2005100013, "Commercial Vehicle Tire Condition Sensors." Research performed by Booz Allen Hamilton, Inc., McLean, Va.

Many of the aftermarket TPMS are difficult to use for the end user and to market for the distributors due to several reasons:

Tire location programming. Since most TPMS display only which tire is underinflated on the screen of the receiver, there is a need to program the system to read which transmitter is on which wheel. This is a time consuming and often confusing procedure for the common user and even for the vehicle maintenance personnel. Some TPMS have the transmitters preprogrammed at the factory which means a broken transmitter needs to be replaced with the right preprogrammed unit from the factory, and no spare units will be available required in inventory for the fleet.

Preset pressure ranges. Often the pressure warning threshold has been preset by the system manufacturer which means that for a fleet to purchase these devices they need to order units with the right warning threshold for each vehicle since the pressure differs from vehicle to vehicle and often differs depending on the axle the tire is mounted to. These systems make it difficult for the distributor to provide his customer with all the right pressure ranges in advance. However, many systems can be programmed for the warning threshold but by an often rather complicated series of inputs to the system.

Very few systems allow several monitors and a capability to cross monitor several vehicles which make those systems useless for maintenance and service personnel.

No systems are capable of monitoring a series of trailers waiting to be picked up by a tow vehicle such as a tractor.

The intent with the present invention is to address inconvenience factors in checking the tire pressure and the shortcoming of other systems.

BRIEF SUMMARY OF THE INVENTION

An object of the present invention is to provide a highly visible warning device, located at the wheel in addition to a receiver with both visible and audible warning inside the vehicle or maintenance personnel possession, which would alert of low tire pressure.

Yet another object of the invention is to provide a warning device, which can be easily individually calibrated according to the desired tire pressure.

Yet another object of the invention is to provide a TPMS which is capable of monitoring any tire pressure range used in truck, tractor, or trailer tires.

Yet another object of the invention is to provide a warning device which does not need programming to be able to identify which tire is low.

Yet another object for the invention is to provide the driver with an eye-catching warning both at the tire and inside the cab.

Yet another object for the invention is to provide the driver with an audible warning inside the cab.

Yet another object for the invention is to provide the maintenance personnel with an eye-catching warning with a remote receiver.

Yet another object for the invention is to provide the maintenance personnel with an audible warning with a remote receiver.

Yet another object for the invention is to be able to monitor the tire pressure of trailers without a tow vehicle hooked up.

Yet another object for the invention is to provide a gate guard for a fleet of trucks with an eye-catching warning with a remote receiver to be able to monitor all vehicles passing by.

Yet another object for the invention is to provide the gate guard with an audible warning with a remote receiver to be able to monitor all vehicles passing by.

Yet another object of this invention is providing a system which does not give false alarms due to changes in ambient temperature.

Yet another objet for this invention is to provide a system where one tow vehicle tractor can be hooked up with an unlimited number of different trailers without any reprogramming of transmitter or receiver and still have the system monitoring all wheels of both tow vehicle and trailer.

Yet another objet for this invention is to provide a system where there is no limitation how many tires can be monitored simultaneously.

Yet another object of this invention is providing a system where neither the sensor nor the transmitter uses any electricity when the tire pressure is correct.

Yet another object of this invention is providing a system which has a low battery warning for both transmitter and receiver.

Yet another object of this invention is providing a system which will monitor the tire pressure while vehicle is either moving or parked.

Yet another object for this invention is to relocate the filling point of the tire to a location more convenient and accessible.

Yet another object for this invention is to be able to check the tire pressure with the system in place without removing any parts.

Yet another object for the invention is to provide a silent warning by the tire to eliminate any disturbance to the surroundings.

Yet another object for the invention is to provide a simple method of testing the functionality and battery conditions of the warning device.

Yet another object of the invention is to provide a TPMS which is easily installed by service personnel without special tooling or training.

Yet another object of the invention is to provide a TPMS which has negligible or no effect on tire balancing.

Yet another object of the invention is to provide a TPMS which does not need to be removed to change batteries in the Sensor/Transmitter Unit.

Yet another object of the invention is to provide a TPMS where the batteries can be changed without deflating the tire or affecting the tire pressure.

Yet another object of the invention is to provide a TPMS which uses standard off the shelf batteries which can easily be changed by service personnel without special tools or training.

Yet another object of the invention is to provide a TPMS which has a long battery life.

Yet another object of the invention is to provide a TPMS which does not need to be removed when tires are replaced, except for disconnecting hoses.

Yet another object of the invention is to provide a TPMS which does not need to be re-programmed when tires are replaced.

Yet another object is to provide a system of low tire pressure monitoring and warning, which is easy to install and maintain at low cost for OEM and aftermarket applications.

Yet another object is to provide a system for maintaining even tire pressure between two linked tires to increase tire life.

Yet another object is to provide a safety mechanism when even tire pressure between two tires is linked and one tire is damaged by subsequently shutting off the air flow between the linked tires so that the air pressure in the undamaged tire is maintained in a drivable condition.

The present invention achieves its objects by providing a sensor and transmitter unit located on a bracket in the center of rear wheels or attached to the rim on the front wheels. The sensor/transmitter has a transparent cap with a bright light emitting diode LED and Radio Frequency RF antenna and circuitry for the LED flashing and the RF sending mounted on a small printed circuit board PCB. The LED start flashing and the RF signal will be transmitted if the tire pressure drops from a set pressure differential, preferably about 8 psi pounds per square inch from set pressure. Under the PCB there is a pressure reference chamber. One wall of the pressure chamber is a membrane, which purpose is to measure the pressure-difference between the Pressure Chamber and the tire pressure. If the tire pressure in the tire drops 8 psi or more the membrane of the reference chamber will be activated and make contact with the support contact washer which will activate the circuitry on the PCB for the flashing of the LED and the transmission of the RF signal indicating that the tire pressure has dropped to a warning level. Inside the body there are batteries which will power the circuitry on the PCB. The LED can visually be seen at the sensor/transmitter unit and an LED seen and beeper or alarm heard by a remote receiver inside the driver's cabin or in the possession of maintenance personnel.

The manners in which the invention achieves its objects and other objects which are inherent in the invention will become more readily apparent when reference is made to the accompanying drawings wherein like numbers indicate corresponding parts throughout.

DETAILED DESCRIPTION OF THE INVENTION

Figure 1:
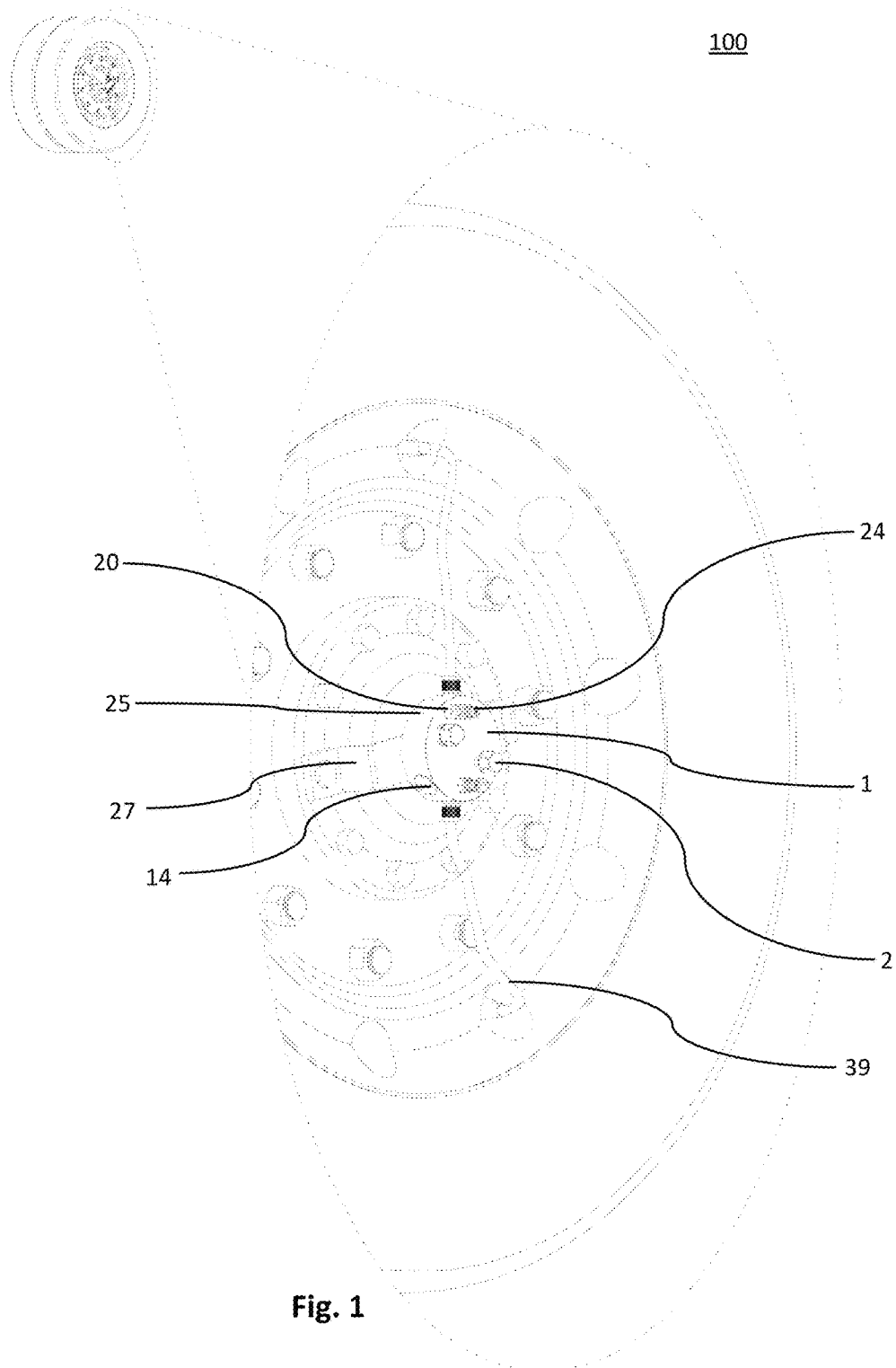
FIG. 1 is a perspective view of a preferred embodiment with a portion of the view magnified to illustrate the placement of the invention relative to a pair of wheels.
Figure 2:
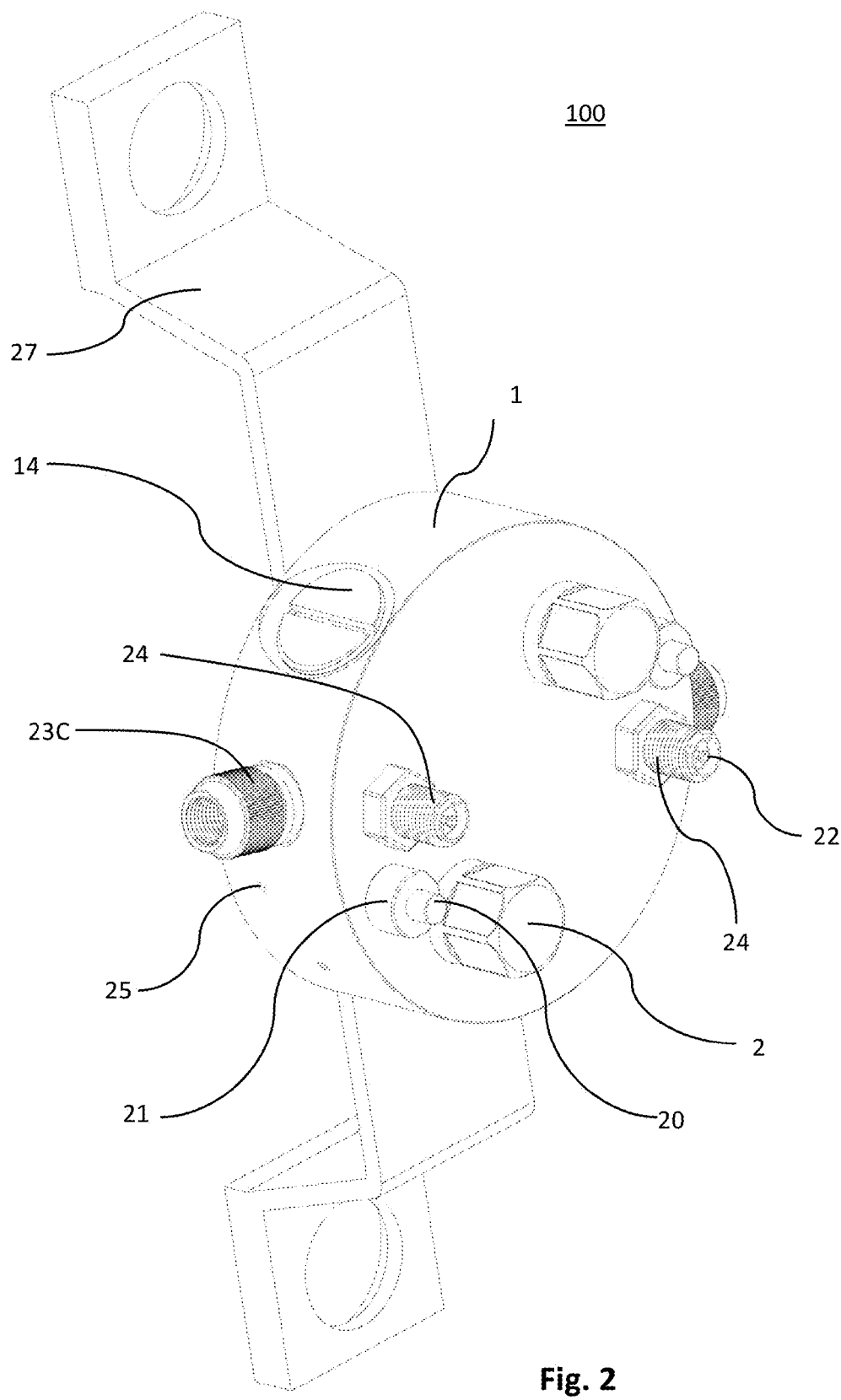
FIG. 2 is a perspective view of a preferred embodiment separated from a wheel.
Figure 3A:
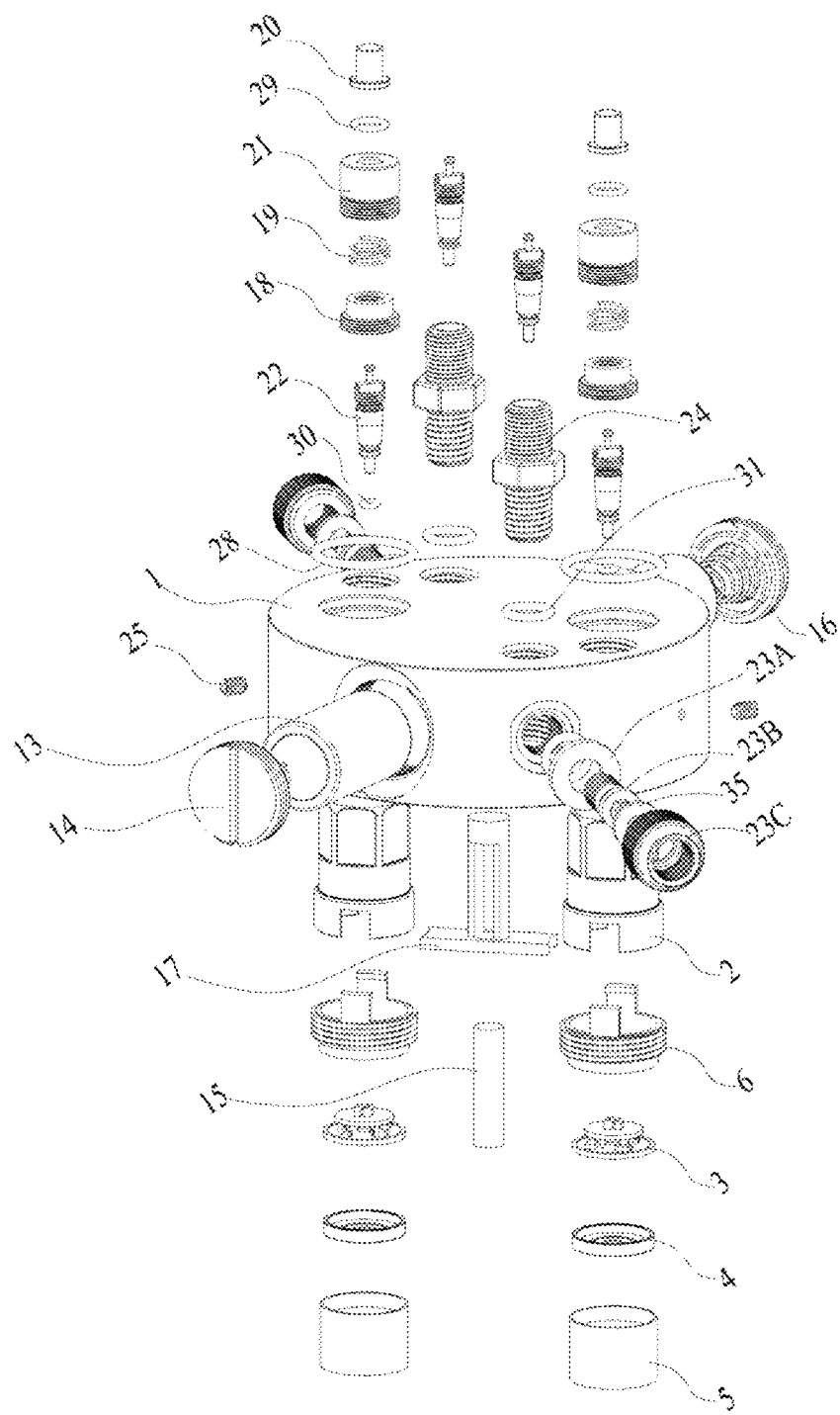
FIG. 3A is an exploded view of a top portion of a preferred embodiment.
Figure 3B:
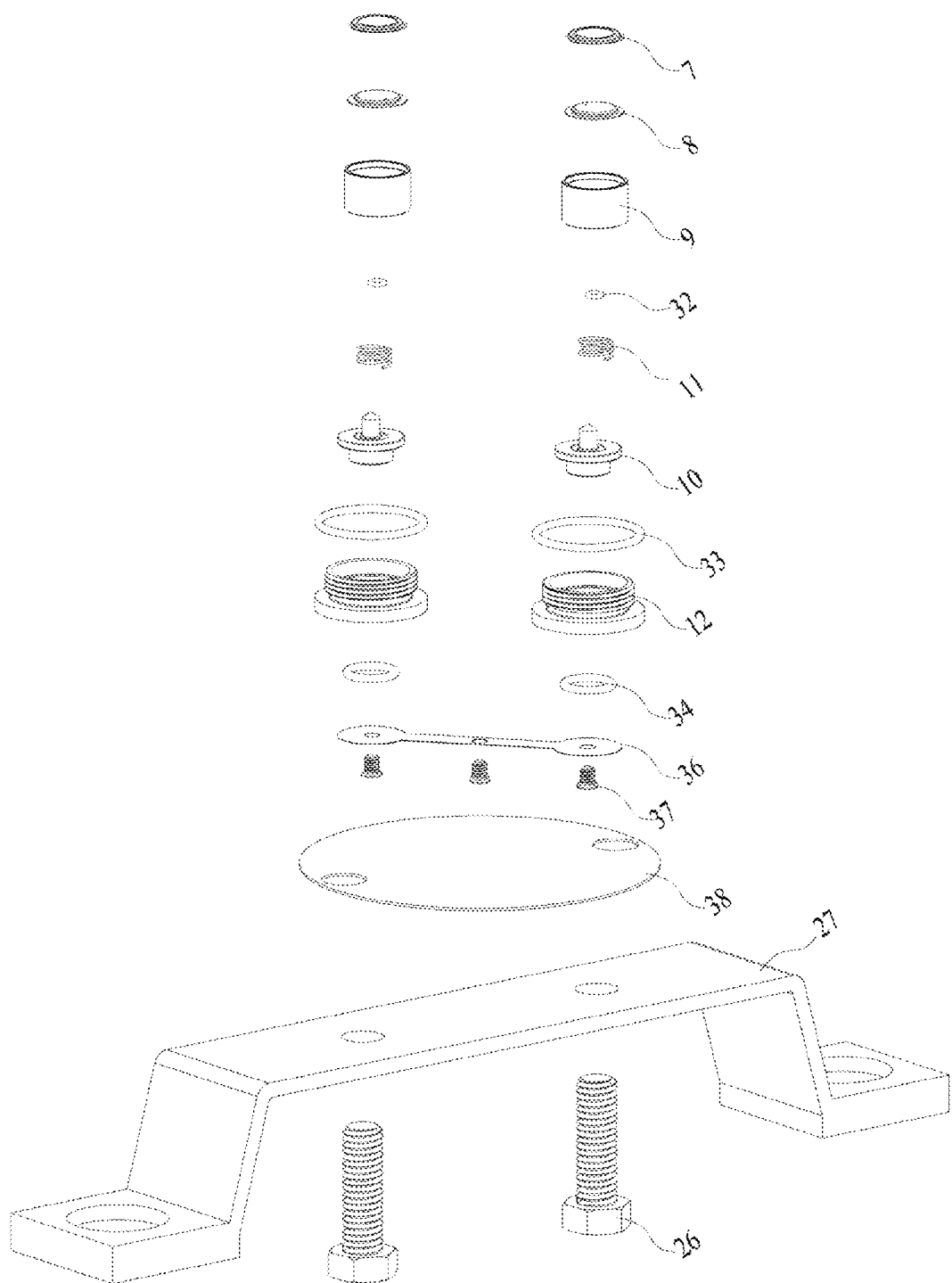
FIG. 3B is an exploded view of a bottom portion of a preferred embodiment.
Figure 4:
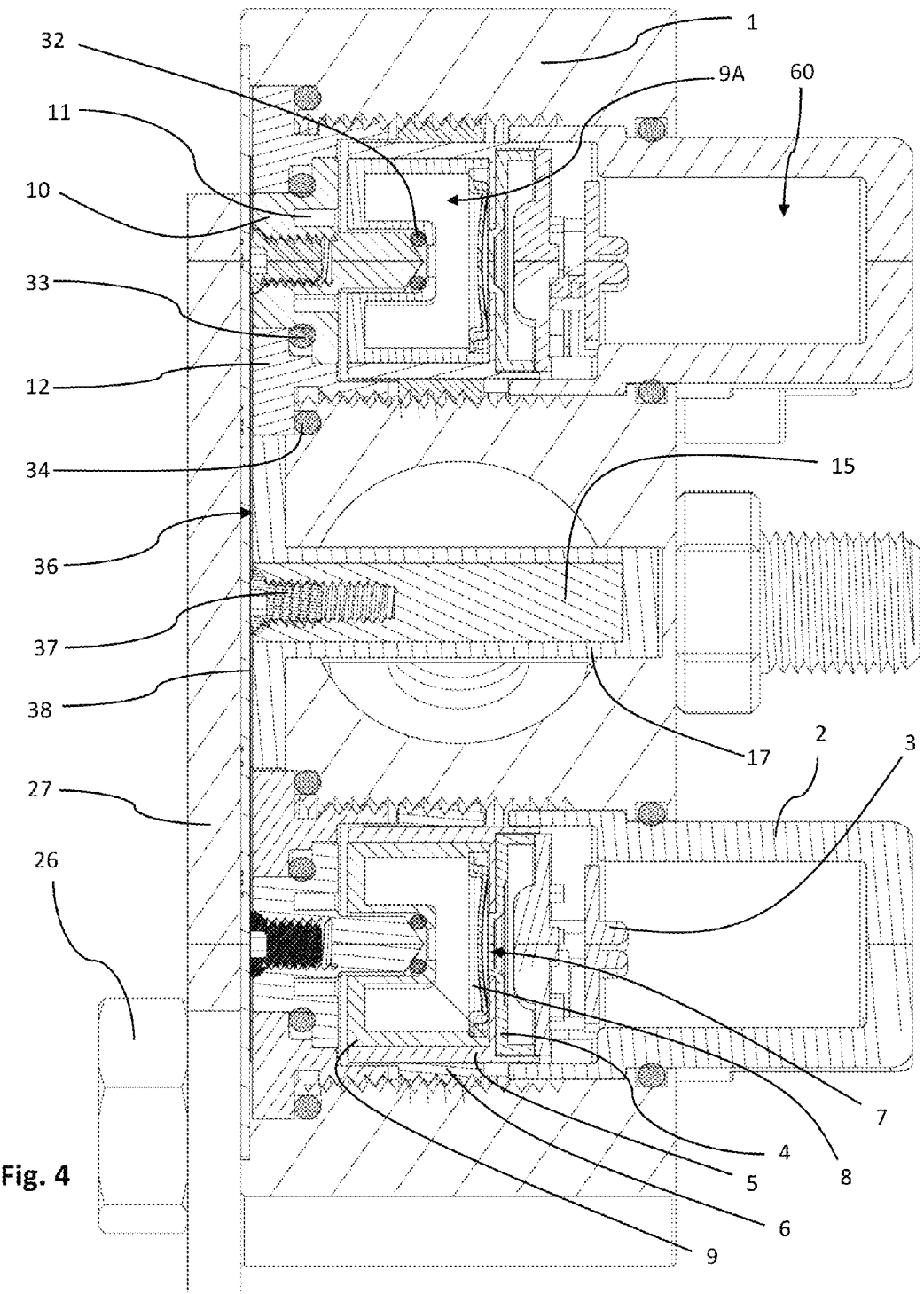
FIG. 4 is a cross section view of a preferred embodiment.
Figure 5:
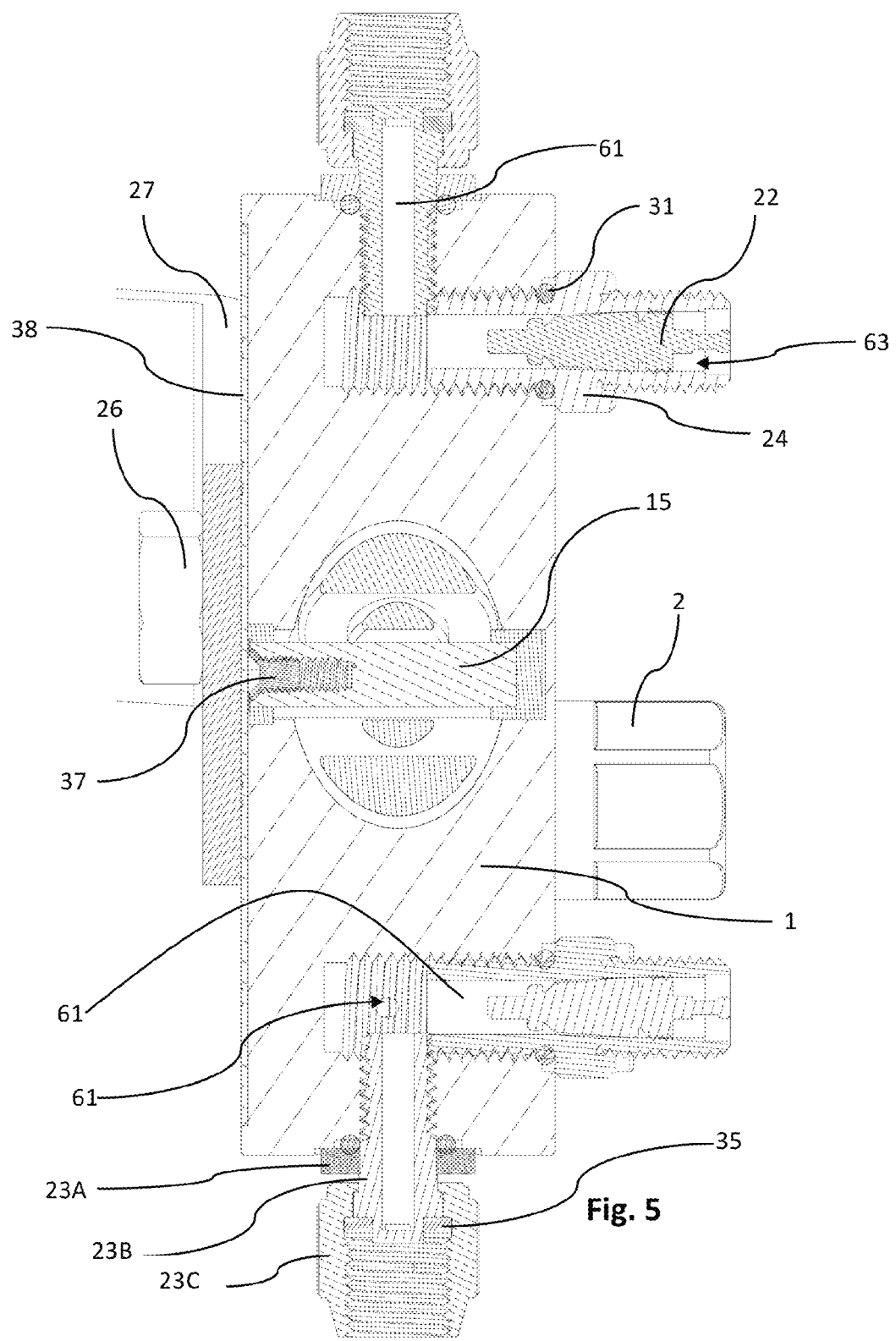
FIG. 5 is a cross section view of a preferred embodiment.
Figure 6:
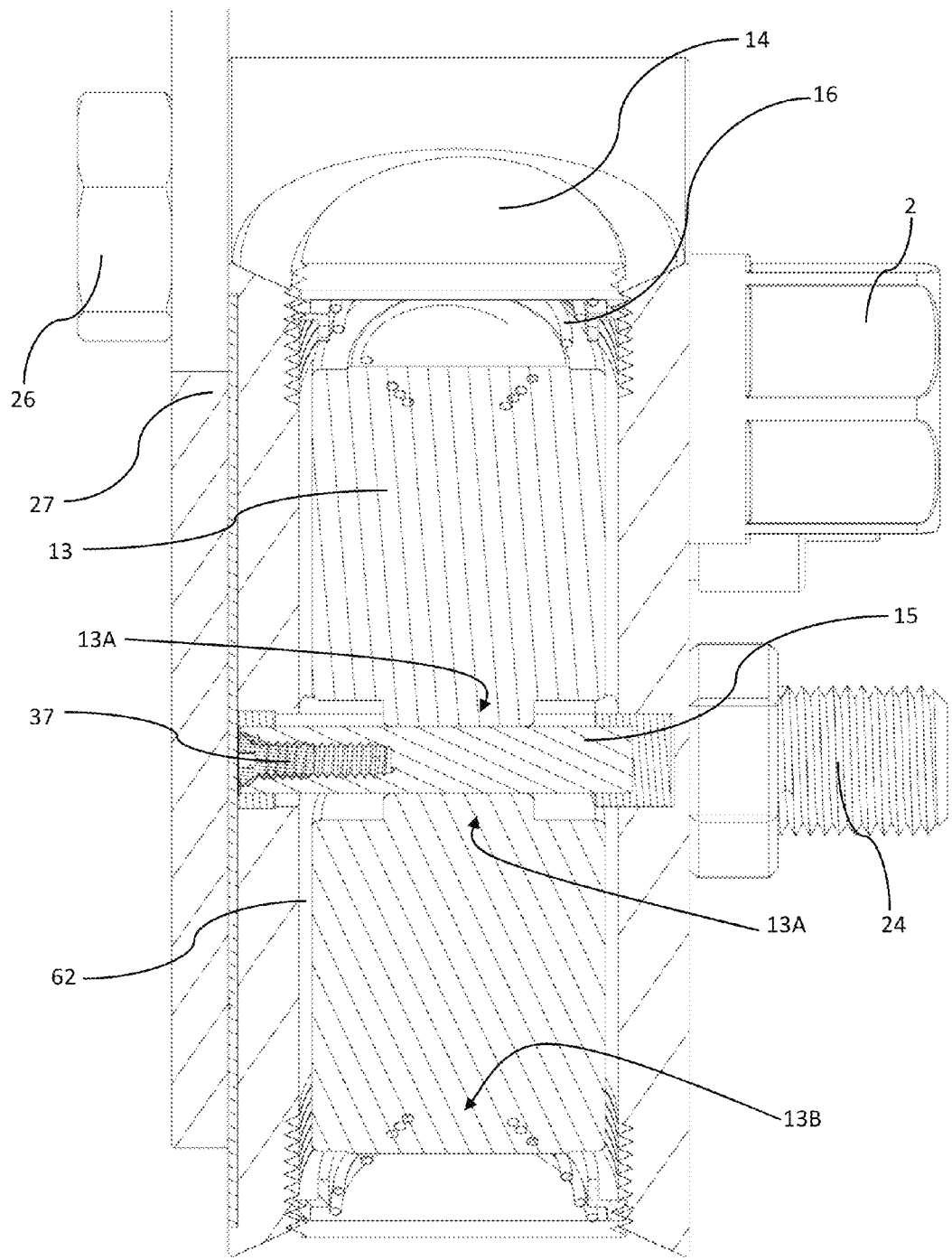
FIG. 6 is a cross section view of a preferred embodiment.
Figure 7:
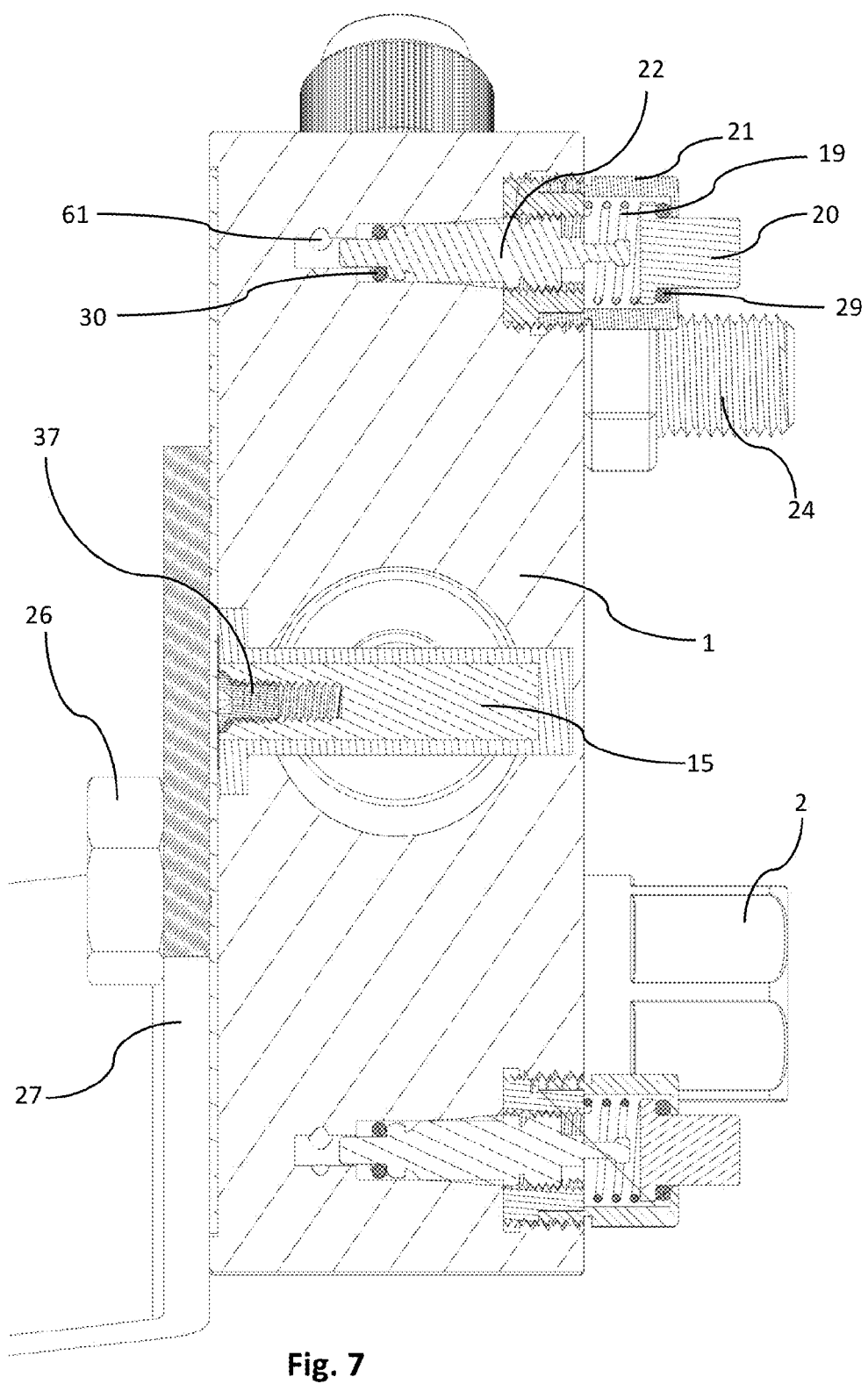
FIG. 7 is a cross section view of a preferred embodiment.

The body 1 should be machined from brass with pressure area 60 for the tire pressure and pressure channels 61 to channel the pressure into the right areas. Body 1 also has a battery cavity 62 and a test button cavity 63. Pressure area 60, valve stem 24, inlet adapter comprised of 23A, 23B, 23C and test button cavity 63 are all connected through pressure channels 61 in the body 1. The batteries 13 have a positive end 13A in contact with the battery center pin 15 and a negative end 13B completes a circuit and allows current to flow when a battery spring 16 is in contact with a battery end cap screw 14 to make the body 1 a negative conductor. The positive side is connected from the battery center pin 15 via the connector screw 37 to the connector strip 36 to the pressure chamber closing pin 10 to the pressure chamber contact spring 11 to the pressure Chamber 9 which has the membrane 7 soldered to it. If the pressure in the pressure chamber 9 is greater than the pressure in the pressurized area 60 the membrane 7 will be activated and move enough to touch the support contact washer 4 which is in direct contact with the PC board complete with radio 3 and provide the positive power to the PC board complete with radio 3. The negative side of the PC board complete with radio 3 will be in constant contact with the chamber threads 6 which are in direct contact with the negatively charged body 1.

The sensor/transmitting unit 100 also achieves its objects by having a mechanical sensor, membrane 7, for the pressure drop. The membrane 7 on the pressure chamber 9 is a mechanical device and requires no electricity. When the reference pressure in the pressure chamber 9 exceeds the tire pressure by 8 psi the membrane 7 will move and contact the support contact washer 4 and the PCB circuitry will be energized. The monitoring is using no battery energy since the batteries are totally disconnected until the tire pressure has dropped 8 psi. This maximizes the battery life.

Alternative Pressure Sensor

Instead of using the mechanical sensing system with a pressure chamber with a membrane, the sensing system can be replaced by mechanical spring loaded or an electronic sensing device After installing the sensor/transmitting unit 100 on its mounting bracket 27 and the flex hoses 39 are connected to the tire valve stems 24 the sensor/transmitting unit 100 can be calibrated. The calibration is done by turning the lens 2 counter-clockwise about one turn until it stops. The lens 2 turns the chamber threads 6 which in turn pushes the pressure chamber 9 towards the pressure chamber closing pin 10 which with the help of the O-Ring for chamber pin 32 seal the pressure chamber 9. The pressure chamber 9 is located inside the pressurized area 60 and will now therefore have trapped reference pressure 9A which is the same pressure inside the pressure chamber 9 as inside the pressurized area 60. The lens 2 then seals the pressure chamber 9 when it is rotated back to its original position. In a preferred embodiment, if the tire pressure drops 8 psi or more from being in direct connection with the pressurized area 60 through the pressure channels 61 the pressure in the pressurized area 60 will also drop the equal amount. The pressure chamber 9 will therefore have the 8 psi more pressure than the pressurized area 60 which will activate the membrane 7 which will touch the support contact washer 4 which completes the electrical circuit and activates electrical circuitry on the PC board complete with radio 3 which start flashing an LED on the PC board complete with radio 3 and sending out an RF signal to be picked up by a receiver unit (not shown). To stop the PC board complete with radio 3 from flashing and transmitting RF signal the tire pressure has to be brought back to the original pressure where the reference pressure was set or the sensor/transmitting unit 100 needs to be re-calibrated. The RF signal can be preprogrammed to have three quick signals then a two second long pause, and then repeat the cycle to keep energy output from the batteries 13 efficient.

The sensor/transmitting unit 100 also achieves its objects by being capable of being calibrated to any tire pressure range used on trucks or heavy vehicles. The system is based on the pressure differential between the pressure chamber 9 and the tire pressure and can therefore adapt to any pressure. The membrane 7 can be designed to move at pressures other than 8 psi, for example if a higher degree of control were wanted the membrane 7 could be designed to move at lower pressure differentials, even down to 1 psi or lower.

A preferred embodiment of the sensor/transmitting unit 100 uses the same frequency and protocol for all units because service personnel could easily monitor vehicles as they returned to a maintenance or storage facility. The range of the sensor/transmitting unit 100 to the receiver is a distance of approximately 60 feet. However, it is possible to create sets of sensor/transmitting units 100 and receiver with different frequencies to reduce the possibility of triggering false readings from nearby vehicles.

The sensor/transmitting units 100 is robust in air pressure measurement and is insensitive to changes in ambient air temperature because when ambient temperature drops both the reference pressure in the pressure chamber 9 and the tire pressure will drop equally.

An additional benefit of the sensor/transmitting unit 10 is mounted on a bracket at the end of the rear axles for dual wheels or "super singles." This position allows easy accessibility so when filling tires with air personnel do not have to get on their knees.

Functionality Check

The functionality of the sensor/transmitting unit 100 and condition of the batteries 13 can easily be verified by depressing the test button pin 20. Test button pin 20 presses down the valve stem core 22 which will perform two tasks simultaneously. First, the O-ring for test button 30 located at the bottom of the valve stem core 22 will close the pressure channel 60 leading to the valve stem 24 where the pressure supply from the tire is provided to the pressurized area 60. Second, to relive the pressure in the pressurized area 60, because the pressurized area 60 is now unpressurized, the pressure chamber 9 has more pressure than the surrounding area and the membrane 7 will be activated and give contact to the membrane 7 which will touch the support contact washer 4 which will activate the circuitry on the PC board complete with radio 3 which start flashing and sending out RF signal(s) to be picked up by a receiver unit 200. When the test button pin 20 is released, the pressure will return to the pressurized area 60 and the membrane 7 will return to its standby position where there is no electrical contact and the flashing and sending out of RF signal will immediately stop.

Receiver

A receiver unit could be installed in the cab of a vehicle which has an audible signal which will beep when it receives the RF signal from the sensor/transmitting unit 100. The audible signal could be turned on or off. The receiver could also have an LED or other light indicator to turn on when it receives the RF signal from the sensor/transmitting unit 100. The visible signal could be turned on or off. The receiver could be wired to receive power from the vehicle battery or have its own battery. A receiver could also be portable, for example, for service or maintenance personnel. A portable receiver could have rechargeable batteries.

Alternative Preferred Embodiment

Figure 8:
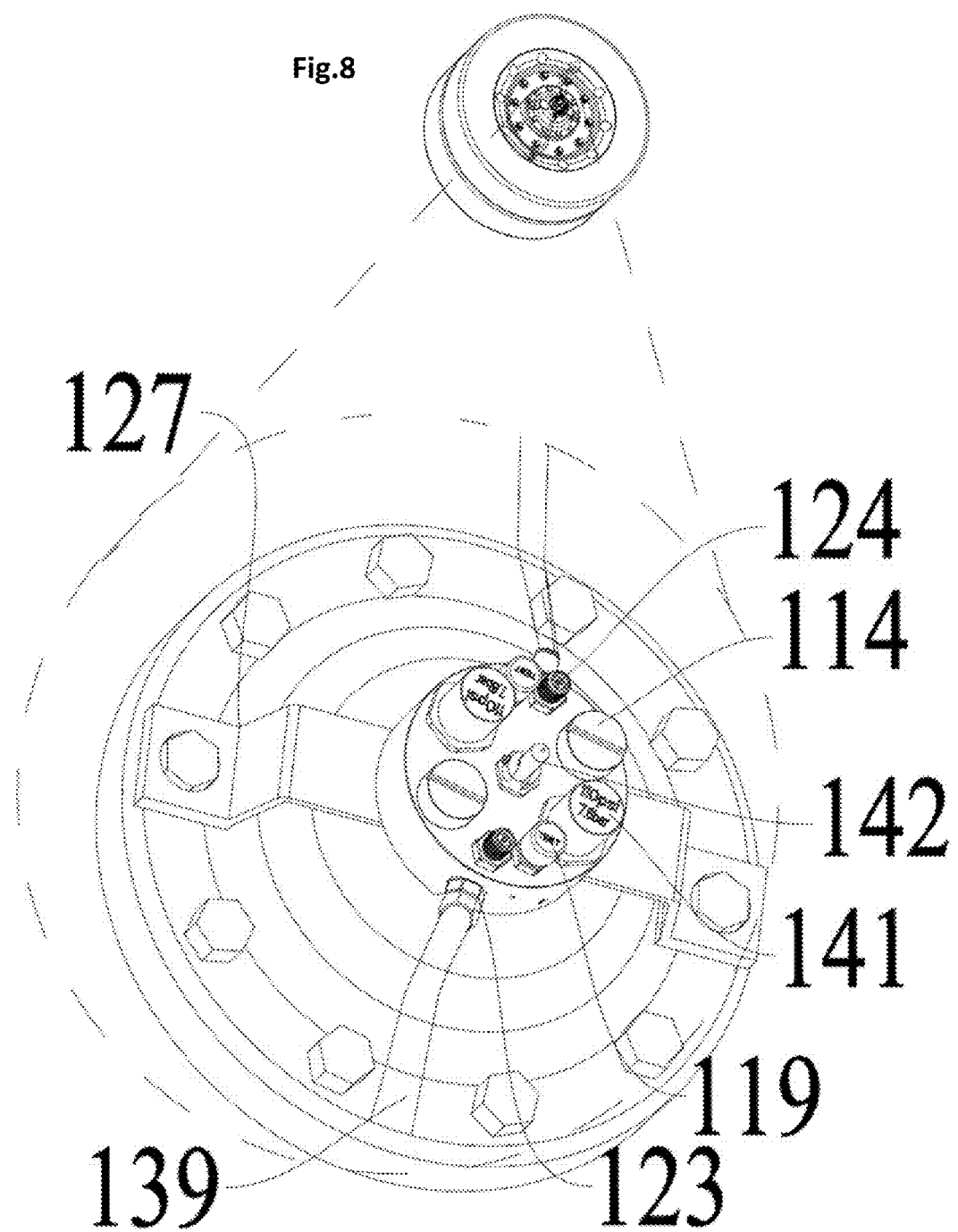
FIG. 8 is a perspective view of an alternative preferred embodiment with a portion of the view magnified to illustrate the placement of the invention relative to a pair of wheels.
Figure 9:
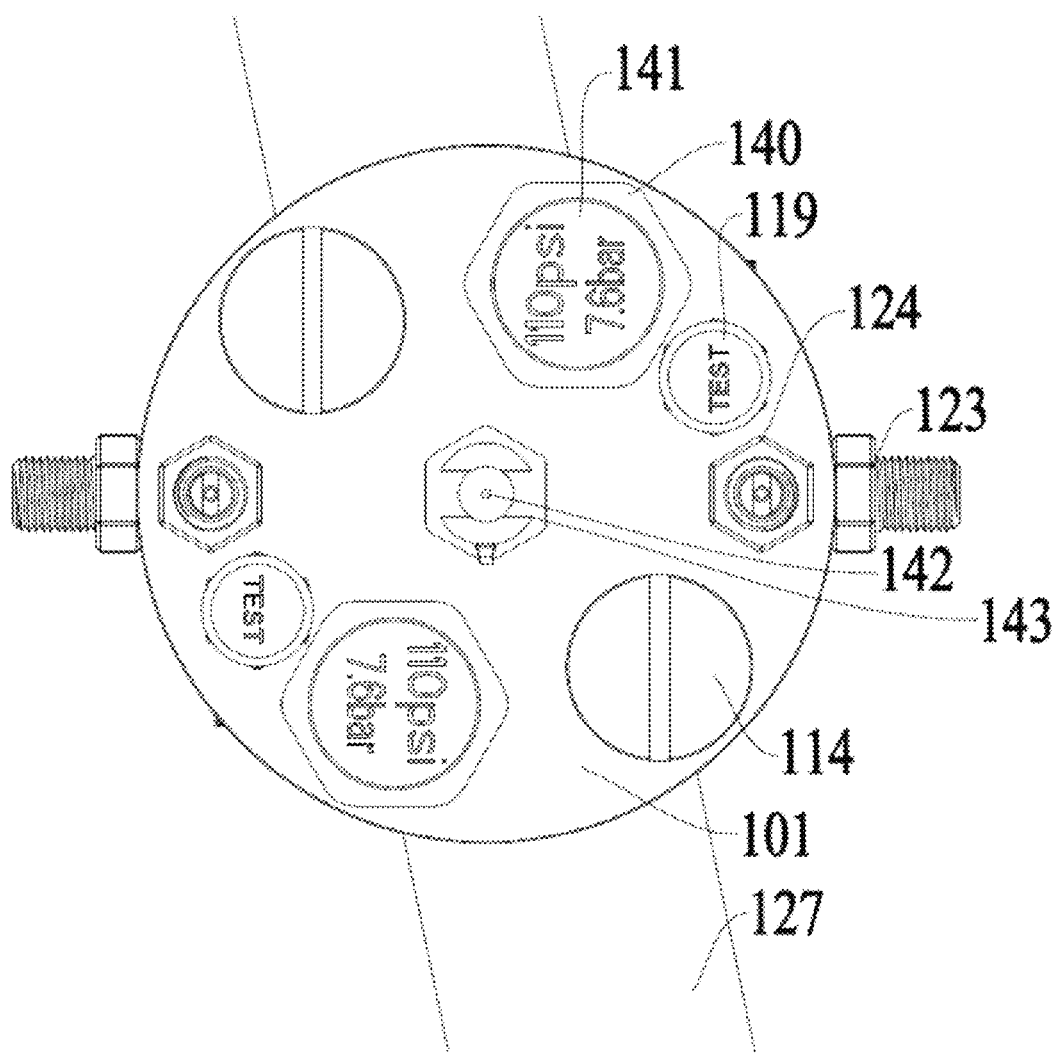
FIG. 9 is a perspective view of a preferred embodiment separated from a wheel.
Figure 10A:
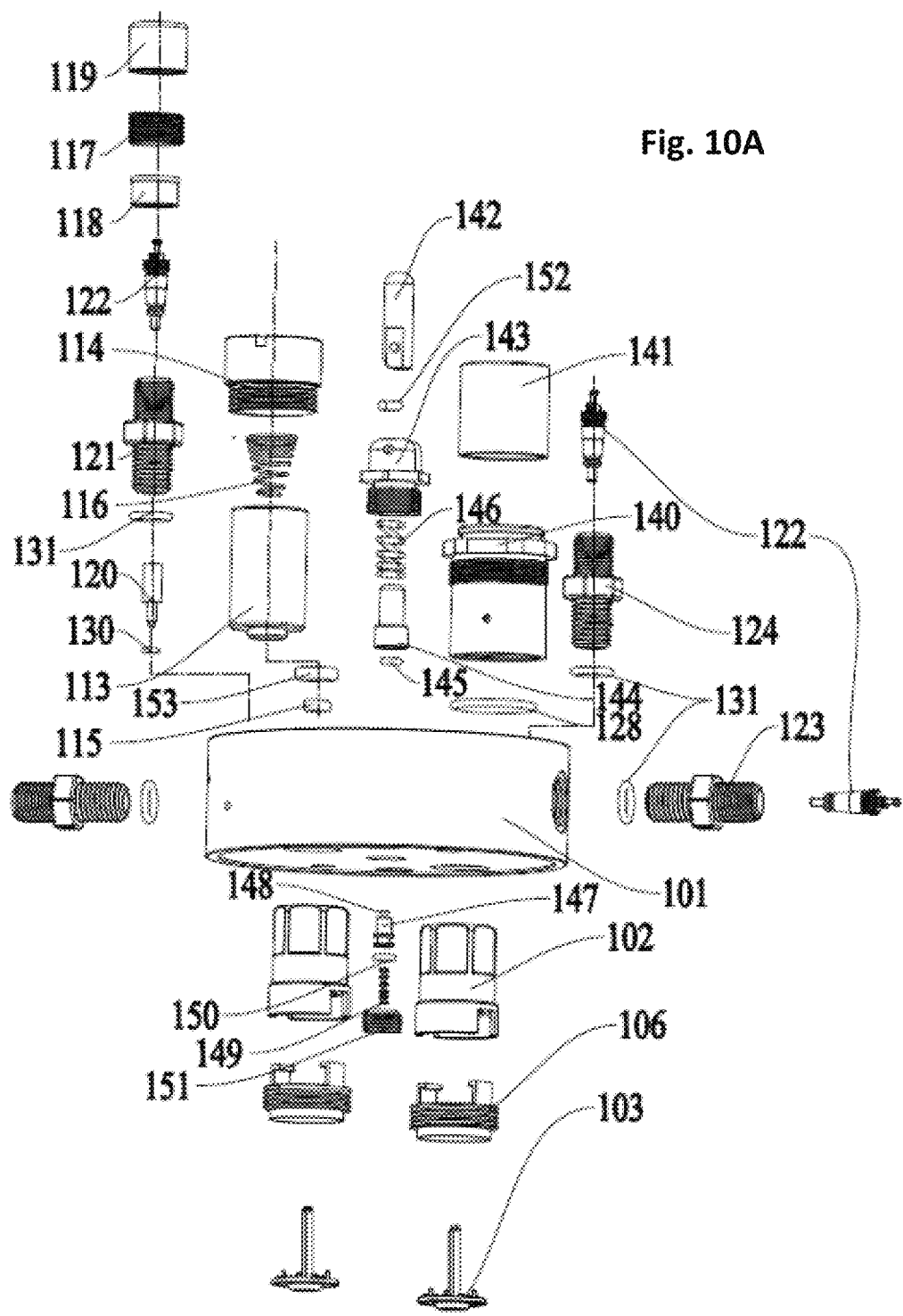
FIG. 10A is an exploded view of a top portion of an alternative preferred embodiment.
Figure 10B:
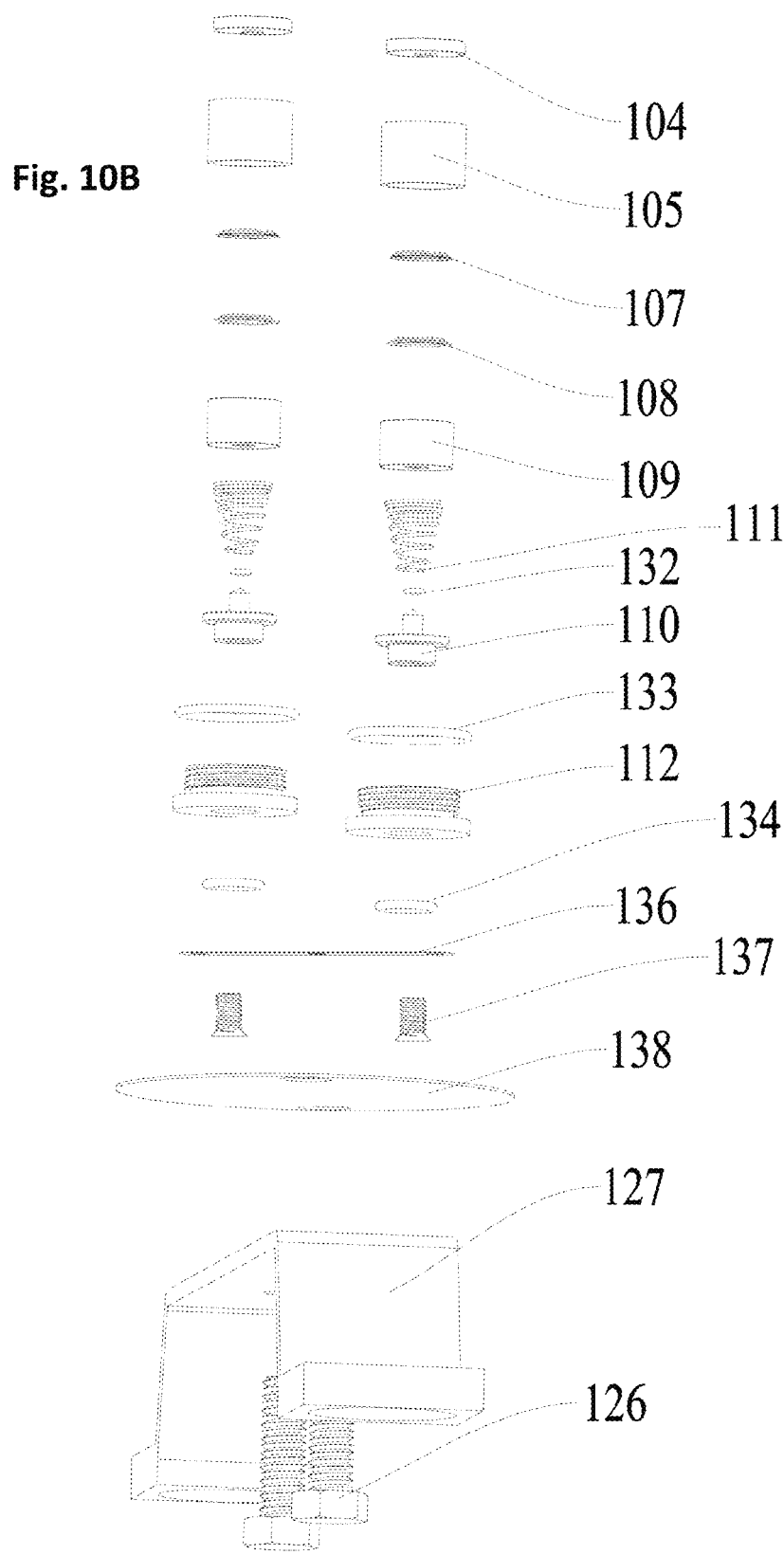
FIG. 10B is an exploded view of a bottom portion of an alternative preferred embodiment.
Figure 11:
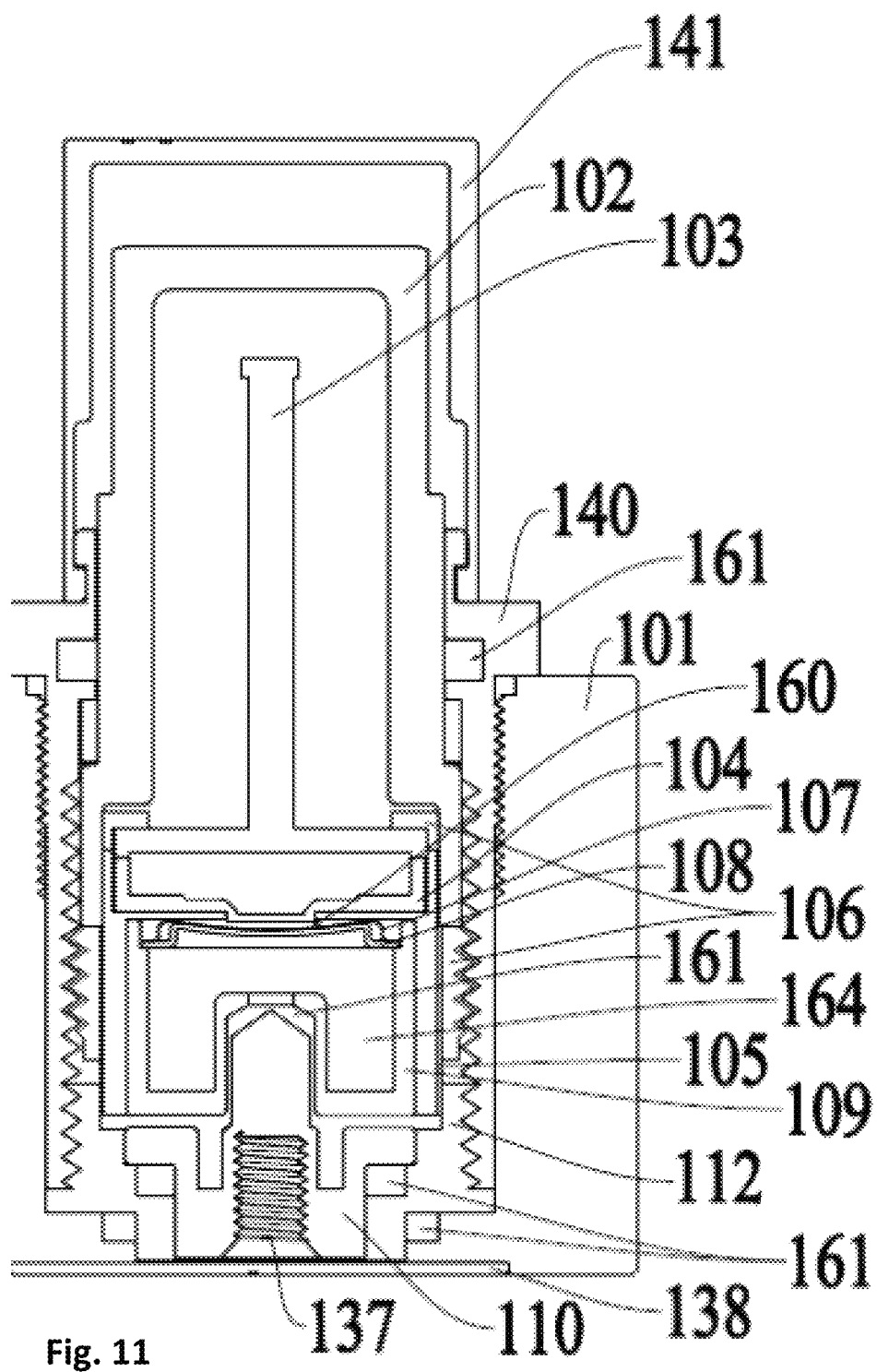
FIG. 11 is a cross section view of an alternative preferred embodiment.
Figure 12:
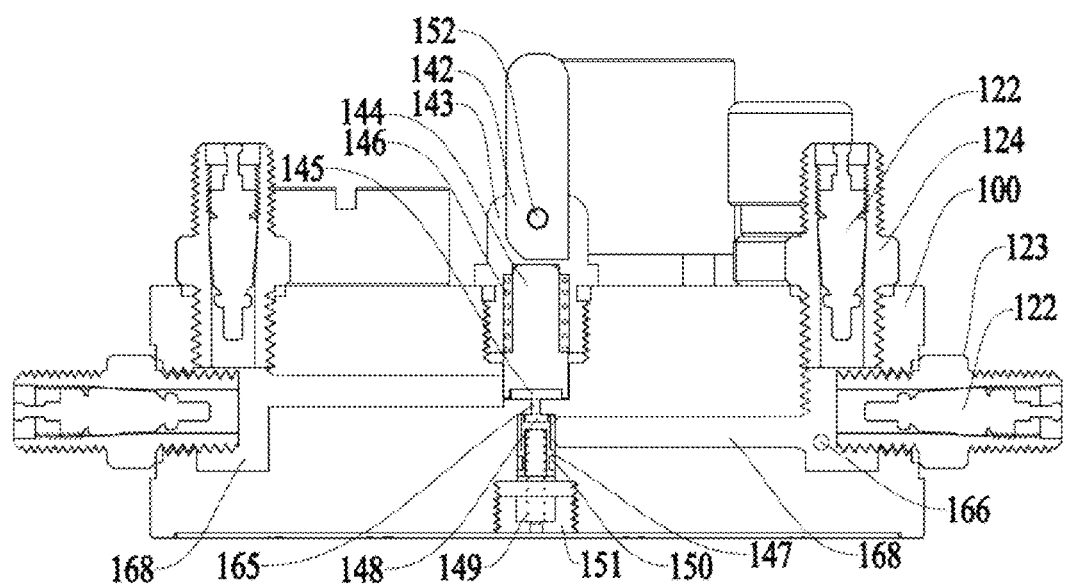
FIG. 12 is a cross section view of an alternative preferred embodiment.
Figure 13:
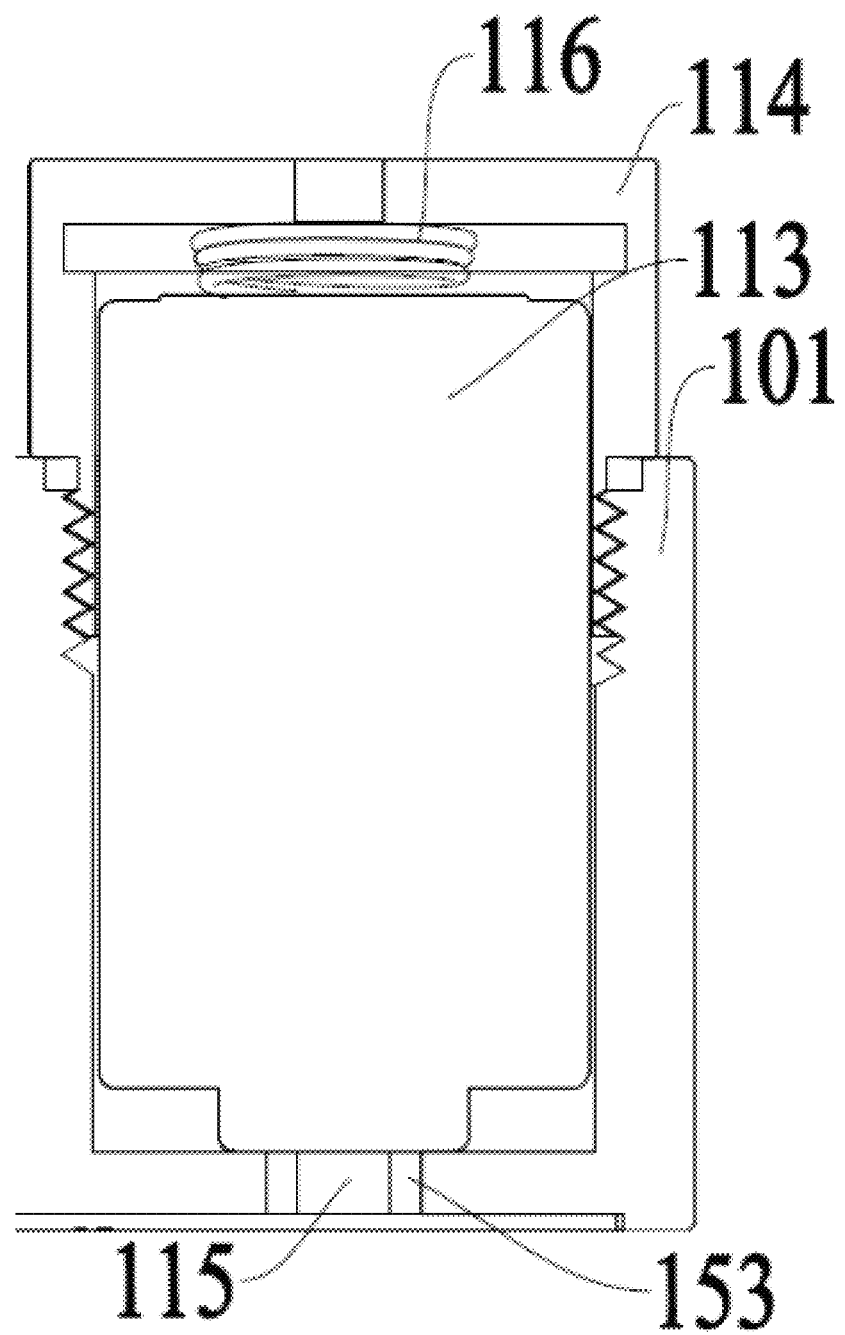
FIG. 13 is a cross section view of an alternative preferred embodiment.
Figure 14:
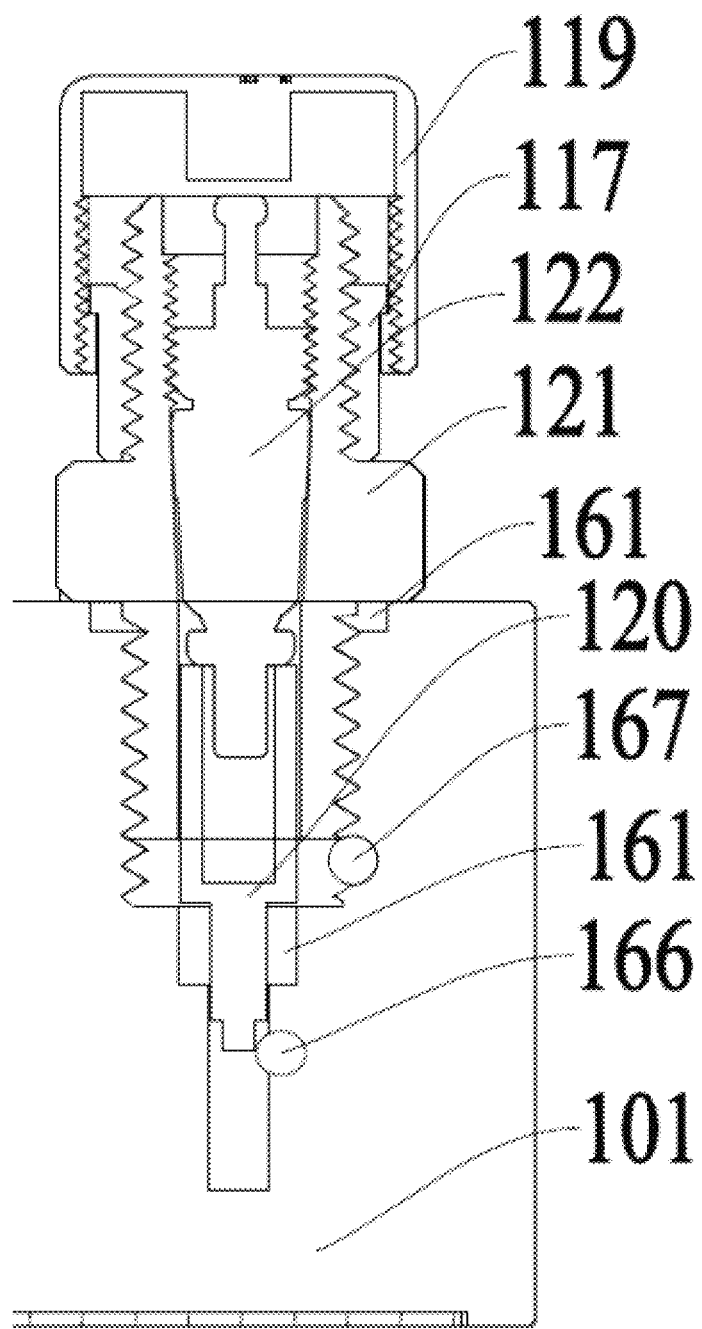
FIG. 14 is a cross section view of an alternative preferred embodiment.

In an alternative preferred embodiment the body 101 is configured with additional features to allow the sharing of air between two linked tires but at the same time have a safety feature that allow air flow to be cut off automatically in the event of a catastrophic failure of one of the tires, even if the balancing valve would manually left open FIGS. 8-14. There are two modes described, the first is where a balancing valve lever 142 is in the vertical position. When the balancing valve lever 142 is in the vertical position the balancing valve plunger 144 is in the open position that allows air to flow freely between air channel from (163 to 165) 168. When the balancing valve lever 142 is in the horizontal position the balancing valve plunger 144 is in the closed position that stops air from flowing freely between air channels from (163 to 165) 168. There is an automatic balancing valve plunger 147 with a spring 149 that has a preset tension and can be fine tuned by twisting the adjustment screw 151 so that for example the air pressure in one or both tires drops below 80 PSI (eighty pound per square inch) the balancing valve plunger 147 is automatically closed, thus isolating the air between the tires.

Also, in the alternative preferred embodiment a inlet adapter 123 can be substituted for a more durable connection between air lines such as at flex hose 139, compare to the inlet adapter 23A,23B,23C in the first preferred embodiment disclosed above.

PART LIST

| Part name | Part Number |
|---|---|
| Body | 1 |
| Lens | 2 |
| PC Board complete with Radio | 3 |
| Support Contact Washer | 4 |
| Isolation Housing | 5 |
| Chamber Threads | 6 |
| Membrane | 7 |
| Membrane liner | 8 |
| Pressure Chamber | 9 |
| Pressure Chamber Closing Pin | 10 |
| Pressure Chamber Contact Spring | 11 |
| Pressure Chamber Housing Nut | 12 |
| Batteries | 13 |
| Battery End Cap Screw | 14 |
| Battery Center Pin | 15 |
| Battery Spring | 16 |
| Battery Plastic Middle Part | 17 |
| Test Button Threads | 18 |
| Test Button spring | 19 |
| Test Button Pin | 20 |
| Test Button Housing | 21 |
| Test Button/Valve Stem Valve Core | 22 |
| Inlet Adapter | 23A, 23B, 23C |
| Valve Stem | 24 |
| Set Screws | 25 |
| Mounting Bolts | 26 |
| Mounting Bracket | 27 |
| O-Ring for Lens | 28 |
| O-Ring for Test Button Upper | 29 |
| O-Ring for Test Button Lower | 30 |
| O-Ring under Inlet Adapter/Valve stem | 31 |
| O-Ring for Chamber Pin | 32 |
| O-Ring for Chamber Nut | 33 |
| O-Ring for Chamber Closing Pin Bottom | 34 |
| O-Ring inside inlet adapter | 35 |
| Connector Strip | 36 |
| Connector Screws | 37 |
| Bottom Sticker/Insulator | 38 |
| Flex Hose | 39 |
| Body | 101 |
| Lens | 102 |
| PC Board Complete with Radio Transmitter | 103 |
| Support Contact Washer | 104 |
| Isolation Housing | 105 |
| Chamber Threads | 106 |
| Membrane | 107 |
| Membrane liner | 108 |
| Pressure Chamber | 109 |
| Pressure Chamber Closing Pin | 110 |
| Pressure Chamber Contact Spring | 111 |
| Pressure Chamber Housing Nut | 112 |
| Batteries | 113 |
| Battery End Cap Screw | 114 |
| Battery Contact Pin | 115 |
| Battery Spring | 116 |
| Battery Contact Pin Insulation | 153 |

PART LIST -continued

| Part name | Part Number |
|---|---|
| Test Button Threads Inner | 118 |
| Test Button Cap | 119 |
| Test Button Pin | 120 |
| Test Button Housing | 121 |
| Valve Stem Valve Core | 122 |
| Inlet Adapter | 123 |
| Valve Stem | 124 |
| Set Screws | 125 |
| Mounting Bolts | 126 |
| Mounting Bracket | 127 |
| O-Ring for Lens | 128 |
| O-Ring for Test Button Lower | 130 |
| O-Ring under Inlet Adapter/Valve stem/Test Button | 131 |
| O-Ring for Chamber Pin | 132 |
| O-Ring for Chamber Nut | 133 |
| O-Ring for Chamber Closing Pin Bottom | 134 |
| Connector Strip | 136 |
| Connector Screws | 137 |
| Bottom Sticker/Insulator | 138 |
| Flex Hose 1 | 139 |
| Pressure Chamber Housing | 140 |
| Optional Locking Sleeve for Lens | 141 |
| Balancing Valve Lever | 142 |
| Balancing Valve Housing | 143 |
| Balancing Valve Plunger | 144 |
| Balancing Valve Plunger Seal | 145 |
| Balancing Valve Plunger Spring | 146 |
| Automatic Shut Off Valve Plunger | 147 |
| Automatic Shut Off Valve Plunger Seal | 148 |
| Automatic Shut Off Valve Spring | 149 |
| Automatic Shut Off Valve O-ring | 150 |
| Automatic Shut Off Valve Adjustment Screw | 151 |
| Balancing Valve Lever Pin | 152 |
| Battery Contact Pin Insulation | 153 |
| Air Pressure Area for Sensor | 160 |
| O-Ring Cavity | 161 |
| Air Pressure Area for Test Button | 162 |
| Air pressure Area for Inlet Adapter and Valve Stem | 163 |
| Pressure Chamber | 164 |
| Balacing Air Channel | 165 |
| Air Channel from 163 to 162 | 166 |
| Air Channel from 162 to 160 | 167 |
| Air Channel from 163 to 165 | 168 |
| Air Channel from/to | 169 |

It will be understood that various modifications can be made to the various embodiments of the present invention herein disclosed without departing from the spirit and scope thereof. For example, various devices are contemplated as well as various types of construction materials. Also, various modifications may be made in the configuration of the parts and their interaction. Therefore, the above description should not be construed as limiting the invention, but merely as an exemplification of preferred embodiments thereof. Those of skill in the art will envision other modifications within the scope and spirit of the present invention as defined by the claims appended hereto.

I claim:

1. A tire pressure monitoring system comprising a tire pressure sensor and a transmitter for sending an RF signal to a receiver when a tire pressure drops below a predefined pressure differential; the tire pressure sensor is mounted on an axle or an axle hub more than ten centimeters from a valve stem on a tire; and wherein the tire pressure sensor is insensitive to changes in ambient air temperature surrounding the tire, and when ambient temperature drops, both the predefined pressure differential in a pressure chamber of the tire and the tire pressure drop equally.

2. The tire pressure monitoring system of claim 1, wherein the pressure sensor is made of a membrane that continuously monitors pressure but only sends an alarm when the tire pressure drops below a predefined pressure differential by closing an electrical circuit.

3. The tire pressure monitoring system of claim 2, wherein the pressure sensor battery can be exchanged with a fresh battery without having to remove the tire or the sensor from the sensor mount.

4. The tire pressure monitoring system of claim 1, wherein the pressure sensor measures tire pressure at ambient temperature.

5. The tire pressure monitoring system of claim 1, wherein the pressure sensor is in a housing body.

6. The tire pressure monitoring system of claim 1, further comprising an LED that flashes when the tire pressure drops below the predefined pressure differential.

7. The tire pressure monitoring system of claim 1, wherein the receiver has an LED or speaker for signaling that the tire pressure dropped below a predefined pressure differential.

8. The tire pressure monitoring system of claim 1, wherein the predefined pressure differential is between 3 psi and 10 psi.

9. A tire pressure monitoring system comprising the tire pressure sensor, a tire pressure sharing channel and a transmitter for sending an RF signal to a receiver when a tire pressure drops below a predefined pressure differential and a safety trigger wherein the tire pressure drops below a lower predefined pressure the safety trigger stops air from flowing in the channel.

* * * * *